United States Patent [19]

Iwamoto

[11] Patent Number: 5,626,433
[45] Date of Patent: May 6, 1997

[54] BALL JOINT

[75] Inventor: Takashi Iwamoto, Tokyo, Japan

[73] Assignee: Nifco Inc., Yokohama, Japan

[21] Appl. No.: 610,191

[22] Filed: Mar. 4, 1996

[30] Foreign Application Priority Data

Apr. 25, 1995 [JP] Japan ................... 7-124341

[51] Int. Cl.$^6$ ................................... F16C 11/06
[52] U.S. Cl. .................. 403/76; 403/135; 403/143; 403/141; 403/122
[58] Field of Search ................... 403/143, 122, 403/141, 76, 142, 135, 127, 56, 90; 248/181.1, 181.2

[56] References Cited

U.S. PATENT DOCUMENTS

| 4,084,913 | 4/1978 | Schenk ................. 403/141 |
| 4,435,101 | 3/1984 | Sugiyama et al. ......... 403/122 |
| 4,568,216 | 2/1986 | Mizusawa et al. ......... 403/143 |
| 4,601,603 | 7/1986 | Nakayama ............... 403/143 |
| 5,372,446 | 12/1994 | Chamberlin ............. 403/144 X |

FOREIGN PATENT DOCUMENTS

| 3308457 | 9/1984 | Germany ................. 403/122 |
| 221012 | 12/1983 | Japan ................... 403/122 |
| 6-272710 | 9/1994 | Japan . |
| 2109454 | 6/1983 | United Kingdom ......... 403/122 |
| 2123479 | 2/1984 | United Kingdom ......... 403/122 |
| 2290826 | 1/1996 | United Kingdom . |

*Primary Examiner*—Kenneth J. Dorner
*Assistant Examiner*—Harry C. Kim
*Attorney, Agent, or Firm*—Kanesaka & Takeuchi

[57] ABSTRACT

A ball joint is formed of a joint device having a ball holder with a through hole, a plurality of ball abutting ribs projecting inwardly from an inner surface of the ball holder, a ring-shaped projecting stand formed at a lower part of the ball holder to extend along a periphery of the inner surface of the ball holder, a fitting ring disposed on the projecting stand, and a rotation preventing rib projecting inwardly from the inner surface of the ball holder. The fitting ring is elastically deformable and has a slit. The rotation preventing rib is placed in the slit of the fitting ring to thereby prevent the fitting ring from moving on the projecting stand. In the invention, a ball stud having a spherical fitting part can be reliably disposed between the fitting ring and the ball abutting ribs.

8 Claims, 4 Drawing Sheets

FIG. 6
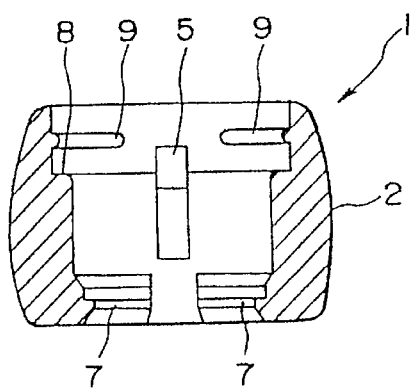
FIG. 9
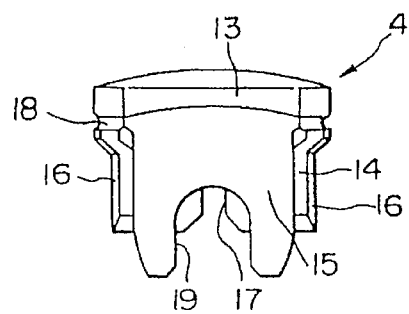
FIG. 7
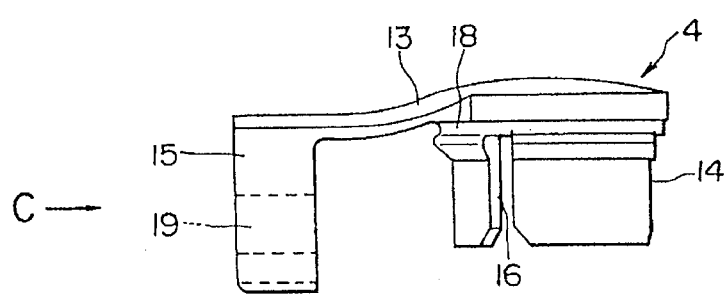
FIG. 8
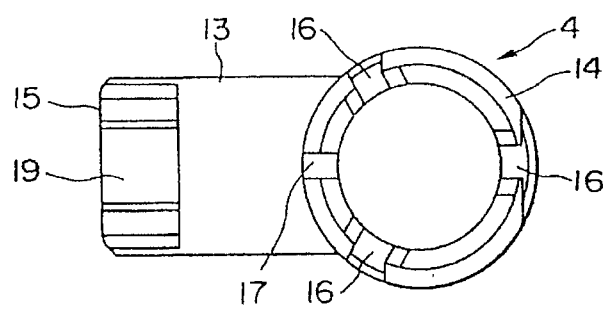
FIG. 10(a)
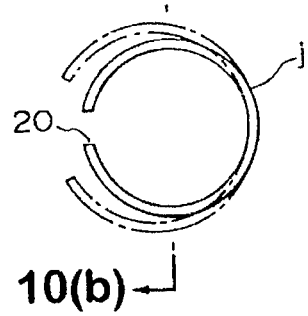
FIG. 10(b)

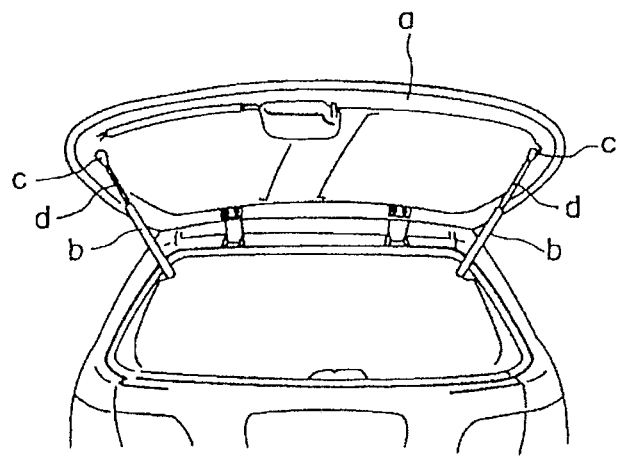
FIG. 11 PRIOR ART
FIG. 12 PRIOR ART
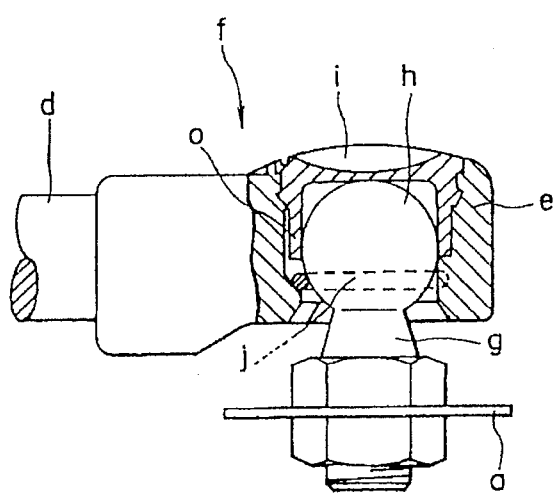
FIG. 13(a) PRIOR ART
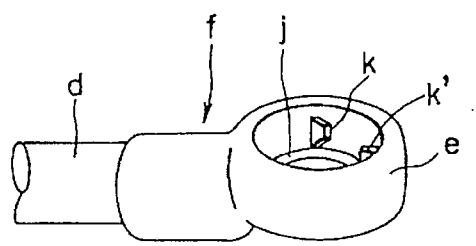
FIG. 13(b) PRIOR ART
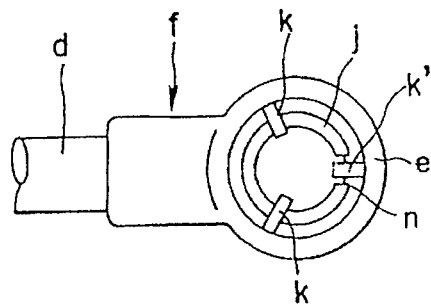
FIG. 13(c) PRIOR ART
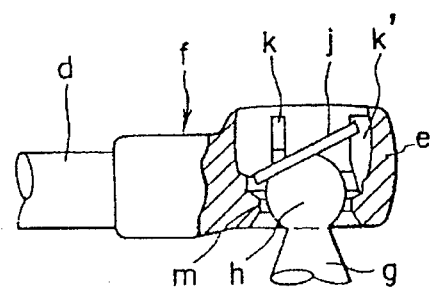

BALL JOINT

BACKGROUND OF THE INVENTION AND RELATED ART STATEMENT

The present invention relates to a ball joint, and more particularly, to a ball joint preferably used to connect a distal end of a support strut to a door, which operates to keep opening of a door, such as a back door of a hatchback vehicle or a mini-van, or a trunk door of a general automobile, such as a sedan.

In a back door of an automobile, such as a hatchback or a mini-van, or a trunk door of a general automobile, such as a sedan, as shown in FIG. 11, support struts b for keeping a door a (in FIG. 11, a back door of a hatchback is shown) open in opening the door a are attached. In this case, since a connecting part between a distal end of the strut bar d of the support strut b and the door a is subjected to a very complicated movement by opening and closing operations of the door a, in order to sufficiently correspond to the complicated movement, a ball joint c is generally used for connecting the strut bar d with the door a.

Conventionally, as the ball joint c, a ball joint as shown in FIG. 12 has been proposed (Japanese Patent Publication (KOKAI) No. 6-272710). Namely, in this ball joint, as shown in FIG. 12, a joint device f having a substantially cylindrical ball holder e is attached to a distal end of a strut bar d, and a spherical fitting part h of a ball stud g attached to the door a is inserted into an elastically deformable C-shaped fitting ring j disposed in the ball holder e of the joint device f. Then, an upper surface of the ball holder e is closed by a cap i.

In the joint device f, as shown in FIGS. 13(a)–13(c), three ball abutting ribs k, k, k' are formed along an axis of the ball holder e to project from an inner peripheral surface of the ball holder e, and a ring-shaped projecting stand m is projected along a periphery of a lower end of the inner peripheral surface. The fitting ring j is provided between the projecting stand m and the ball abutting ribs k, and the ball abutting rib k' is disposed in a slit n of the fitting ring j to thereby prevent the fitting ring j from rotating. And, the spherical fitting part h of the ball stud g is pressed into the ball holder e from an opening at a lower end thereof.

When the fitting part h is inserted, the fitting ring j once expands, so that the spherical fitting part h is fitted between the fitting ring j and the ball abutting ribs k, k, k' to thereby attach the ball stud g to the joint device f. In this case, an upper surface of the spherical fitting part h abuts against the ball abutting ribs k, k, k' and is supported, and a lower side surface thereof is supported by the fitting ring j, which is elastically returned to the original state by shrinking the expanded diameter. Accordingly, the spherical fitting part h can be surely fitted into the ball holder e of the joint device f.

In the conventional ball joint, however, when the spherical fitting part h of the ball stud g is pressed into the ball holder e, the fitting ring j sometimes moves or escapes upwardly, so that the ball stud g may not be attached to the joint device f.

Namely, since the ball abutting rib k' in the ball abutting ribs k, k, k' is located in the slit n of the C-shaped fitting ring j, when the spherical fitting part h of the ball stud g is pressed into the ball holder e of the joint device f, the ball abutting rib k' does not operate to hold the fitting ring j. The ring j is held by the other ball abutting ribs k to thereby be prevented from escaping or moving upwardly. In this case, as shown in FIG. 13(c), since the fitting ring j may become obliquely such that the side of the ball abutting rib k' is lifted upwardly, the fitting part h of the ball stud g may not be inserted inside the fitting ring j. In some cases, the fitting ring j may be pushed out from the ball holder e.

In this case, as shown in FIG. 12, since the cap i is mounted by inserting a cylindrical leg o projecting from a lower surface thereof into the ball holder e, if the fitting part h of the ball stud g is inserted after the cap i is mounted, the fitting ring j is pressed by the leg o to thereby prevent the aforementioned problem. In the structure of the conventional ball joint, therefore, the fitting part h of the ball stud g must be pressed into the cap only after the cap is mounted, so that a process of work is limited. Therefore, as in an embodiment of the invention described later, in case the distal end of the strut bar d is engaged with a fitting convex provided at the cap to thereby fix and couple the strut bar d with the joint device, when the joint device is fixed and coupled with the strut bar d after the fitting part h of the ball stud g is inserted into the joint device, the conventional structure of the ball joint can not be adopted.

In view of the foregoing, an object of the present invention is to provide a ball joint in which, even before the cap is mounted, the spherical fitting part of the ball stud can be successfully inserted into the joint device with good workability while escape of the fitting ring can be prevented.

SUMMARY OF THE INVENTION

In achieving the foregoing object of the invention, there is provided a ball joint, comprising: a plurality of ball abutting ribs projecting from an inner surface of a ball holder disposed in a joint device to extend along an axial direction of the ball holder; ring-shaped projecting stand projecting from a lower part of the inner surface of the ball holder to extend along a periphery of the ball holder; an elastically deformable fitting ring disposed between the projecting stand and the ball abutting ribs; a spherical fitting part of a ball stud for fitting between the fitting ring and the ball abutting ribs; a cap fitted into an upper surface of the ball holder for closing the same; and a rotation preventing rib projecting from the inner surface of the ball holder along the axial direction of the ball holder. The slit of the fitting ring is engaged with the rotation preventing rib to thereby prevent the fitting ring from rotating.

In the ball joint of the invention, as described above, the inner peripheral surface of the ball holder of the joint device is provided with the rotation preventing rib for preventing the fitting ring from rotating, and the rotation preventing rib is located in the slit of the fitting ring so as to prevent the rotation of the fitting ring. Therefore, when the spherical fitting part of the ball stud is pressed into the ball holder, the fitting ring surely abuts against a plurality of ball abutting ribs provided on the inner surface of the ball holder to thereby securely prevent the fitting ring from moving or escaping upwardly.

As described above, according to the ball joint of the invention, all of the plurality of the ball abutting ribs provided on the inner surface of the ball holder prevent the fitting ring from escaping or moving upwardly, so that the spherical fitting part of the ball stud can be surely inserted into the ball holder. Even before or after the cap is mounted, the spherical fitting part of the ball stud can be satisfactorily pressed into the ball holder.

The cap may be provided with a fitting convex for fixing the strut bar to the cap, and the distal end of the strut bar may be engaged in the fitting convex, to thereby couple and fix the strut bar to the joint device. In this case, after the spherical fitting part of the ball stud is fitted into the joint device, the distal end of the strut bar is inserted into the connecting part of the joint device, and then, the cap is fixed to the joint device to engage the fitting convex provided in the cap with the distal end of the strut bar to thereby couple and fix the strut bar to the joint device. Even in this case, the fitting ring can be surely prevented from escaping or moving upwardly, and the spherical fitting part of the ball stud can be satisfactorily pressed and entered into the ball holder.

BRIEF DESCRIPTION OF THE DRAWINGS

FIG. 6 is a sectional view of the joint device taken along line 6—6 in FIG. 3;

FIG. 7 is a front view of a cap constituting the ball joint;

FIG. 8 is a bottom view of the cap;

FIG. 9 is a side view of the cap seen from an arrow C in FIG. 7;

FIG. 10(a) shows a plan view of a fitting ring constituting the ball joint;

FIG. 10(b) is a sectional view taken along line 10(b)—10(b) in FIG. 10(a);

FIG. 11 is a schematic view showing a back door of a hatchback type automobile in which the ball joint of the invention is preferably used;

FIG. 12 is a partial section view showing a conventional ball joint;

FIG. 13(a) is a schematic perspective view of a joint device constituting the conventional ball joint;

FIG. 13(b) is a schematic plan view of the conventional ball joint; and

FIG. 13(c) is a partially sectional view showing a state of a fitting ring when a spherical fitting part of the conventional ball stud is pressed into the joint device.

DETAILED DESCRIPTION OF PREFERRED EMBODIMENTS

An embodiment of the present invention is described hereunder with reference to the accompanying drawings.

FIGS. 1 through 10 show a ball joint according to an embodiment of the present invention, and as shown in FIG. 11, the ball joint is preferably used for connecting a back door a of an automobile with a distal end of a strut bar d of a support strut b for keeping the back door a open.

Figure 1:
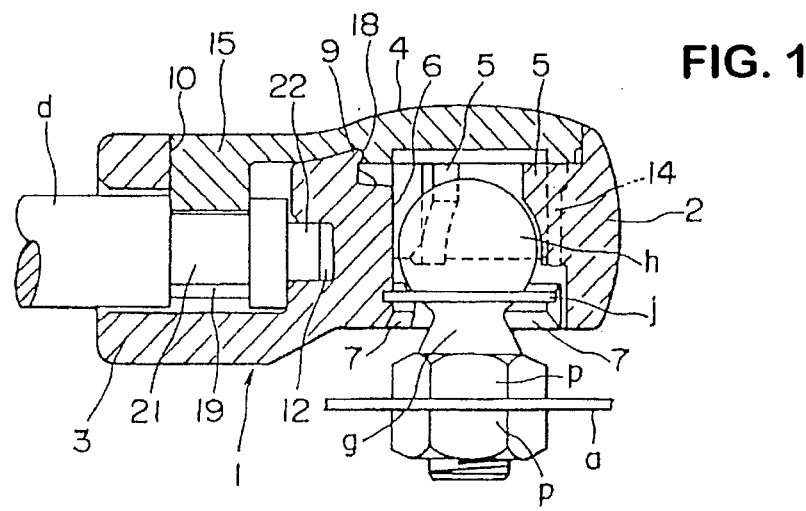
FIG. 1 is a sectional view of a ball joint according to an embodiment of the present invention.

As shown in FIG. 1, the ball joint is provide with a joint device 1 having a cylindrical ball holder 2 and a bar connecting part 3 with a rectangular shape; a fitting ring j disposed in the ball holder 2; a cap 4 engaging the joint device 1 for closing an upper surface of the joint device 1; a ball stud g connected to the ball holder 2; and a strut bar d connected to the bar connecting part 3.

As shown in FIGS. 3 through 6, the joint device 1 is formed by integrally connecting the axially short cylindrical ball holder 2 with the bar connecting part 3 with the rectangular shape. A hollow portion in the ball holder 2 vertically penetrates therethrough, and a hollow portion in the bar connecting part 3 is opened at one end of the bar connecting part 3, i.e. an end portion opposite to the ball holder 2, and closed at the other end thereof.

On an inner peripheral surface of the ball holder 2, three ball abutting ribs 5 with lower parts curved in an arc shape are formed to extend along an axial direction of the hollow portion thereof and to be spaced away from each other with an equal distance in a peripheral or circumferential direction thereof. Also, a rotation preventing rib 6 is disposed between the two ball abutting ribs 5 along the axial direction. Further, at a lower part of the inner peripheral surface of the ball holder 2, three projecting stands 7 with a shape of a protruding strip are disposed equally and circularly along a peripheral direction thereof. Furthermore, an upper part of the inner peripheral surface of the ball holder 2 is formed with a slightly larger diameter through a step portion 8, and three fitting protruding strips 9 for fixing the cap 4 are disposed at the upper part of the inner peripheral surface along the circumferential direction to be spaced apart from each other.

Also, in the bar connecting part 3, a square opening 10 communicating with the hollow portion thereof is provided at an upper surface of the bar connecting part 3, and two inserting concaves 11 extending from the opening 10 to a lower part of the hollow portion are also formed to face against each other. Furthermore, at an innermost end of the hollow portion, i.e. a side of the ball holder 2, a positioning concave 12 with a small diameter is formed.

The cap 4 includes, as shown in FIGS. 7 through 9, a base plate 13 formed of a square part at one side and a circle part at the other side, a cylindrical leg 14 protruding from the circle part or a ball holder closing part, and a fitting convex 15 for fixing the strut bar d protruding from a distal end portion of the square part.

In the leg 14, three slits 16, into which the ball abutting ribs 5 provided in the ball holder 2 of the joint device 1 are inserted, are formed to be spaced apart from each other with an equal distance along the axial direction, and between the two slits 16, there is provided a slit 17, into which the rotation preventing rib 6 disposed in the ball holder 2 of the joint device 1 is inserted. Furthermore, at an outer peripheral surface of a base of the leg 14, there is provided a ring shape recess 18, into which the fitting protruding strips 9 provided in the ball holder 2 of the joint device 1 are fitted. Also, in the fitting convex 15, an engaging concave 19 opened at a distal end of the fitting convex 15 is formed, and an innermost part of the engaging concave 19 has a semicircular shape.

Figure 2:
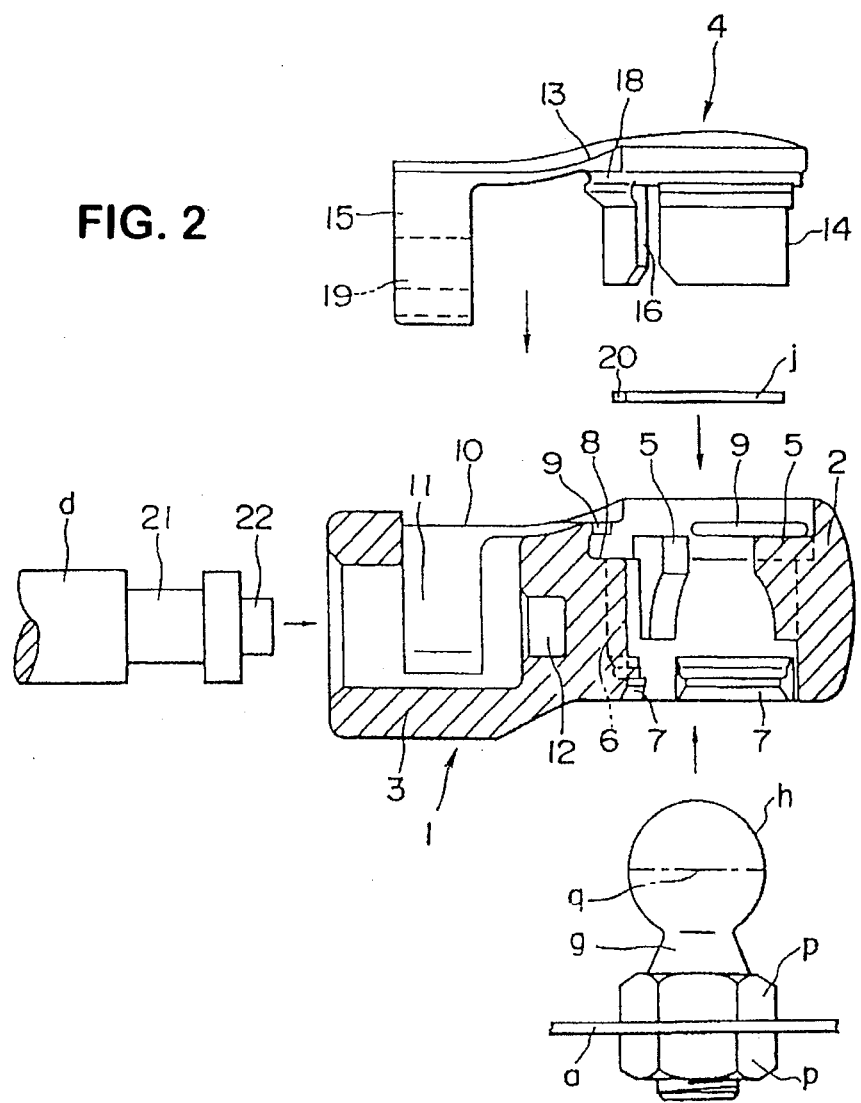
FIG. 2 is a partially sectional exploded view of the ball joint.
Figure 3:
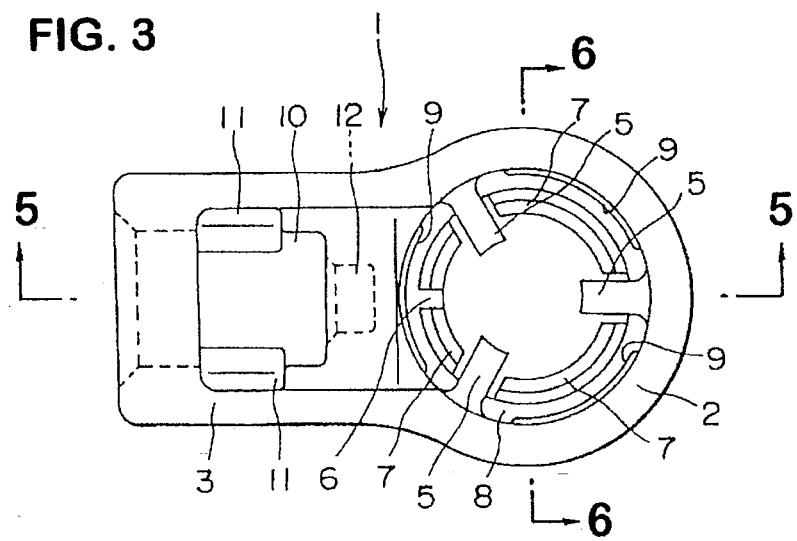
FIG. 3 is a plan view of a joint device constituting the ball joint.
Figure 4:
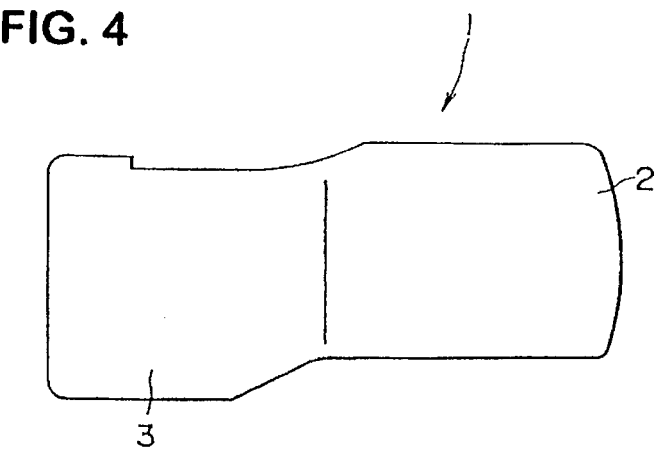
FIG. 4 is a front view of the joint device.
Figure 5:
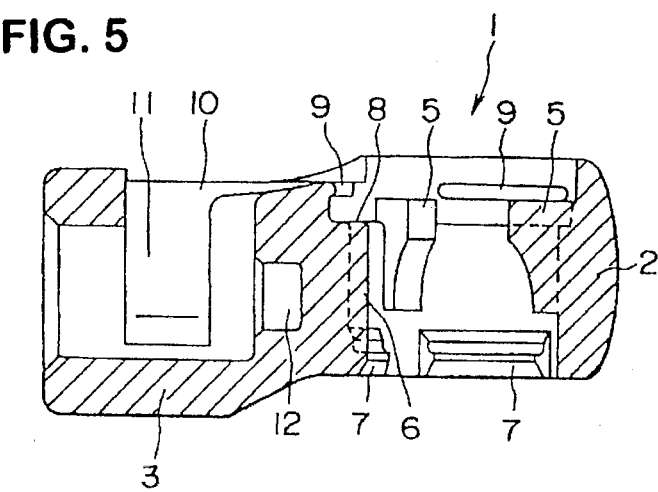
FIG. 5 is a sectional view of the joint device taken along line 5—5 in FIG. 3.

Next, as shown in FIGS. 10(a) and 10(b), the fitting ring j is formed by bending a metal wire into a C-shape, and has a ring shape including a gap 20. As shown by a single-dotted chain line in FIG. 10(a), when the fitting ring j is elastically deformed, it can expand its diameter. Also, the ball stud g is, as shown in FIGS. 1 and 2, structured by integrally forming the spherical fitting part h with a distal end of a bolt shaft, and is fixed by nuts p to the back door a of the automobile. Furthermore, in the strut bar d, as shown in FIGS. 1 and 2, a ring-shaped fitting concave portion 21 is formed at the distal end along a periphery thereof, and a positioning projection 22 in the cylindrical shape with a small diameter and a short length is formed at the end thereof.

In the ball joint of the present embodiment, as shown in FIG. 1, the fitting ring j is disposed between the ball abutting ribs 5 and the three projecting stands 7 provided in the ball holder 2 of the joint device 1, and the spherical fitting part h of the ball stud g is fitted between the fitting ring j and the ball abutting ribs 5. Then, the distal end of the strut bar d is inserted into the hollow portion of the bar connecting part 3 of the joint device 1 for coupling, and the cap 4 is fitted into the upper surface of the joint device 1.

In this case, as shown in FIG. 2, firstly, in the ball holder 2 of the joint device 1, the fitting ring j is inserted from the opening at the upper surface of the ball holder 2. At this time, the rotation preventing rib 6 formed on the inner peripheral surface of the ball holder 2 is engaged with the gap 20 of the fitting ring j, and the fitting ring j in an oblique state is inserted in the ball holder 2 while avoiding the ball abutting ribs 5 so that the fitting ring j can be inserted into the ball holder 2. The inserted fitting ring j is arranged to be disposed on the projecting stands 7 provided at a lower rim of the inner peripheral surface of the ball holder 2. Since the rotation preventing rib 6 is inserted into the gap 20 of the fitting ring j, the rotation of the fitting ring j is surely prevented. Incidentally, the fitting ring j is normally left in a state of being inserted in the ball holder 2 of the joint device 1, and in this state, the joint device 1 is used for coupling the ball stud g and the strut bar d.

Next, the spherical fitting part h of the ball stud g is pressed into the ball holder 2 of the joint device 1 from a lower end opening of the ball holder 2, and the distal end of the strut bar d is inserted into the bar connecting part 3.

In this case, when the spherical fitting part h of the ball stud g is pressed into the ball holder 2, the fitting ring j disposed in the ball holder 2 is lifted upwardly to abut against the lower parts of the ball abutting ribs 5. In this state, when the spherical fitting part h is further pushed upwardly, the fitting ring j is enlarged outwardly by a sphere of the spherical fitting part h to expand its diameter to allow an equator portion g (FIG. 2) of the spherical fitting part h to pass through the fitting ring j. When the spherical fitting part h passes through the fitting ring j, the fitting ring j is elastically returned or the expanded diameter shrinks, so that the spherical fitting part h is fitted between the fitting ring j and the ball abutting ribs 5, as shown in FIG. 1.

Thus, an upper surface of the spherical fitting part h is supported by the lower parts of the ball abutting ribs 5 in an arc shape, and a lower half portion of the spherical fitting part h is supported by the fitting ring j to thereby hold the spherical fitting part h pivotable in 360 degrees in the ball holder 2. Also, the distal end of the strut bar d inserted in the hollow portion of the bar connecting part 3 is, as shown in FIG. 1, in a state that the positioning projection 22 formed at the distal end is located in the positioning concave 12 in the hollow portion of the bar connecting part 3.

In this state, the leg 14 and the fitting convex 15 of the cap 4 are respectively inserted into the ball holder 2 of the joint device 1 and the opening 10 of the bar connecting part 3 to thereby attach the cap 4 to the joint device 1, so that the upper surface of the ball holder 2 of the joint device 1 and the opening 10 are closed. In this case, the ball abutting ribs 5 and the rotation prevention rib 6 formed in the ball holder 2 are respectively disposed in the slits 16, 17 formed at the leg 14 of the cap 4, and at the same time, the fitting protruding strips 9 provided at the upper part of the inner peripheral surface of the ball holder 2 are inserted into the recess 18 formed at the base end of the leg 14. Also, the fitting convex 15 of the cap 4 is entered into the hollow portion of the bar connecting part 3 of the joint device 1, and the fitting concave portion 21 at the distal end of the strut bar d inserted into the hollow portion of the bar connecting part 3 and the engaging concave 19 of the fitting convex 15 are engaged with each other. Accordingly, the cap 4 is fixed to the joint device 1, and the strut bar d is coupled and fixed to the joint device 1.

As described before, in the ball joint of the present embodiment, the rotation preventing rib 6 for preventing the rotation of the fitting ring j is provided at the inner surface of the ball holder 2 of the joint device 1 in addition to the three ball abutting ribs 5, and the rotation preventing rib 6 is placed in the gap 20 of the fitting ring j to prevent the fitting ring j from rotation. Therefore, when the spherical fitting part h of the ball stud g is pressed into the ball holder 2, the fitting ring j abuts against the three ball abutting ribs 5 disposed at the inner peripheral surface of the ball holder 2 and is held thereat, so that the fitting ring j can be surely prevented from escaping or moving upwardly.

Consequently, according to the ball joint, by means of the three ball abutting ribs 5 disposed at the inner surface of the ball holder 2, escape or movement of the fitting ring j can be prevented, and the spherical fitting part h of the ball stud g can be surely fitted into the ball holder 2. Although the spherical fitting part h of the ball stud g is pressed into the ball holder 2 before the cap 4 is mounted, the spherical fitting part h can be successfully pressed into the ball holder 2.

Furthermore, in the ball joint of the present embodiment, the fitting convex 15 for fixing the strut bar d is provided in the cap 4 and is engaged with the distal end of the strut bar d to thereby couple and fix the strut bar d to the joint device 1. Therefore, in a state that the strut bar d is not completely fixed to the joint device 1, or that the strut bar d and the joint device 1 are completely separated from each other, it is possible to insert the spherical fitting part h of the ball stud d into the ball holder 2. Consequently, in a state that the support strut b (FIG. 11) having the strut bar d is attached to a body of the automobile and the ball stud g is attached to the back door a, the strut bar d and the ball stud g can be coupled to the joint device 1 with good workability.

Incidentally, the ball joint of the invention is not limited to the above embodiment, and can be modified variously. For example, in the aforementioned embodiment, the hollow portion for inserting the strut bar d is provided in the bar connecting part 3 of the joint device 1, and the fitting convex 15 for engaging with the distal end of the strut bar d is provided in the cap 4, so that when the distal end of the strut bar d inserted into the hollow portion of the bar connection part 3 is engaged with the fitting convex 15 of the cap 4, the strut bar d is coupled and fixed to the joint device 1. Alternatively, the joint device 1 can be integrally formed with the distal end of the strut bar d. Furthermore, shapes, fitting structures and the like of the joint device 1 and the cap 4 can be modified variously within the gist of the present invention.

As described above, according to the ball joint of the present invention, even before the cap is mounted, the escape or movement of the fitting ring can be surely prevented, so that the spherical fitting part of the ball stud can be fitted into the joint device with good workability.

What is claimed is:

1. A combination comprising a ball joint and a strut bar, said ball joint comprising:

a joint device including a ball holder, said ball holder having a through hole and an inner surface around the through hole, and a bar connecting part situated adjacent to the ball holder for connecting the ball holder to the strut bar, said bar connecting part having a hollow portion extending inwardly from a side portion thereof and an opening disposed at an upper surface thereof and communicating with the hollow portion, a plurality of ball abutting ribs projecting inwardly from the inner surface of the ball holder, a ring-shaped projecting stand formed at a lower part of the ball holder, said projecting stand extending along a periphery of the inner surface of the ball holder, a fitting ring disposed on said projecting stand, said fitting ring being-elastically deformable and having a slit, a ball stud having a spherical fitting part, said fitting part being disposed between the fitting ring and the ball abutting ribs, a rotation preventing rib projecting inwardly from the inner surface of the ball holder, said rotation preventing rib being placed in the slit of the fitting ring to thereby prevent the fitting ring from moving on the projecting stand, and a cap fitted in an upper surface of the joint device and having a ball holder closing part for closing the through hole of the ball holder and a fitting convex for fixing the strut bar to the bar connecting part.

2. A combination according to claim 1, wherein said strut bar includes a fitting concave at a distal end thereof and is inserted into the hollow portion in the bar connecting part, said fitting convex of the cap having a concave so that when said strut bar is inserted into the connecting part through the hollow portion and said fitting convex is inserted into the connecting part through the opening, the concave of the fitting convex and the fitting concave are engaged with each other to thereby connect the strut bar and the joint device.

3. A combination according to claim 2, wherein said ball abutting ribs and the rotation preventing rib extend along an axial direction of the through hole.

4. A ball joint device for a ball stud with a spherical fitting part, comprising:

a ball holder having a through hole and an inner surface around the through hole, a bar connecting part situated adjacent to the ball holder adapted to connect the ball holder to a strut bar, said bar connecting part having a hollow portion extending inwardly from a side portion thereof and an opening disposed at an upper surface thereof and communicating with the hollow portion, at least three ball abutting ribs projecting inwardly from the inner surface of the ball holder, a ring-shaped projecting stand formed at a lower part of the ball holder, said projecting stand extending along a periphery of the inner surface of the ball holder, a fitting ring disposed on said projecting stand, said fitting ring being elastically deformable and having a slit, a rotation preventing rib projecting inwardly from the inner surface of the ball holder, said rotation preventing rib being placed in the slit of the fitting ring to thereby prevent the fitting ring from moving on the projecting stand so that when the spherical fitting part of the ball stud is inserted into the through hole through the fitting ring, the fitting ring is held by the abutting ribs, and a cap fitted in an upper surface of the ball holder and having a ball holder closing part for closing the through hole of the ball holder and a fitting convex adapted to fix the strut bar to the bar connecting part.

5. A ball joint comprising:

a joint device having a ball holder, said ball holder having a cylindrical through hole and an inner surface around the through hole, at least three ball abutting ribs projecting inwardly from the inner surface of the ball holder, each ball abutting rib having a bottom surface and a curved side surface, a ring-shaped projecting stand formed at a lower part of the ball holder, said projecting stand extending along a periphery of the inner surface of the ball holder and spaced vertically downwardly away from the bottom surfaces of the ball abutting ribs, a fitting ring disposed on said projecting stand, said fitting ring being elastically deformable and having a slit, a ball stud having a spherical fitting part, said fitting part being disposed between the fitting ring on the projecting stand and the curved side surfaces of the ball abutting ribs, and a rotation preventing rib projecting inwardly from the inner surface of the ball holder, said rotation preventing rib extending upwardly from the projecting stand beyond the bottom surfaces of the ball abutting ribs and engaging the slit of the fitting ring so that the fitting ring is prevented from rotating laterally on the projecting stand, and said fitting ring is prevented from moving upwardly by the bottom surfaces of the at least three ball abutting ribs when the ball stud is installed in the joint device.

6. A ball joint according to claim 5, further comprising a cap fitted in an upper surface of the ball holder for closing the upper surface of the ball holder.

7. A ball joint according to claim 5, wherein said at least three ball abutting ribs are generally equally spaced apart from each other around the inner surface of the through hole parallel to a central axis thereof, and said rotation preventing rib being situated between two of the at least three ball abutting ribs.

8. A ball joint according to claim 7, wherein said rotation preventing rib has the thickness less than that of each of the at least three ball abutting ribs and a linear side surface parallel to the central axis.

\* \* \* \* \*